Feb. 17, 1925.
H. DURRIN
TRAP
Filed March 22, 1924
1,527,034
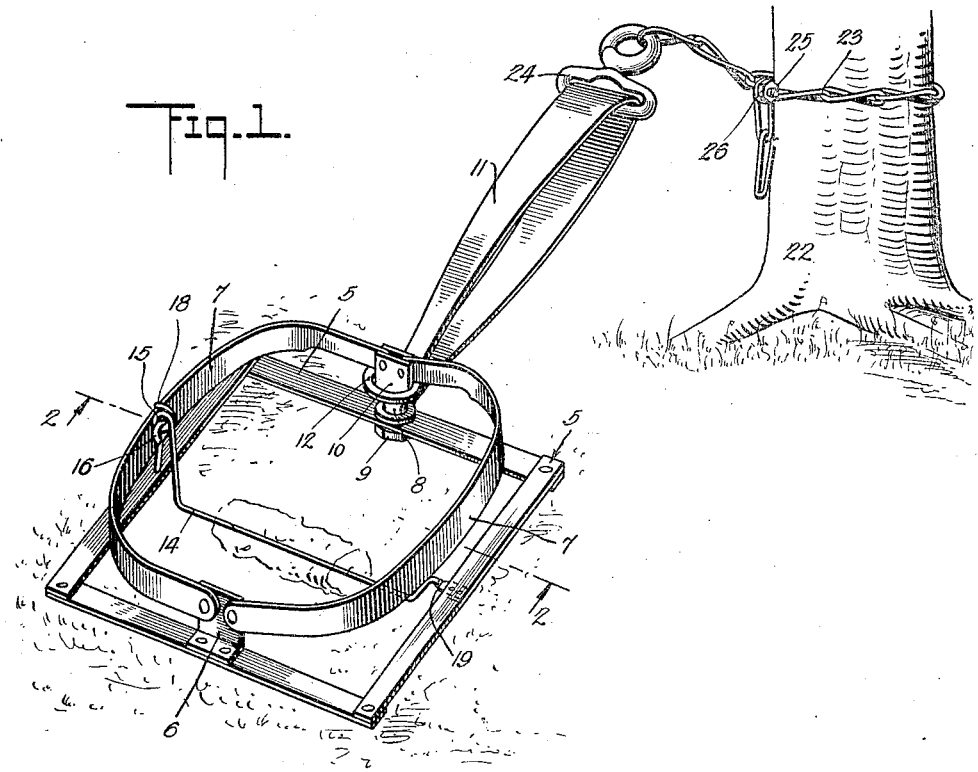
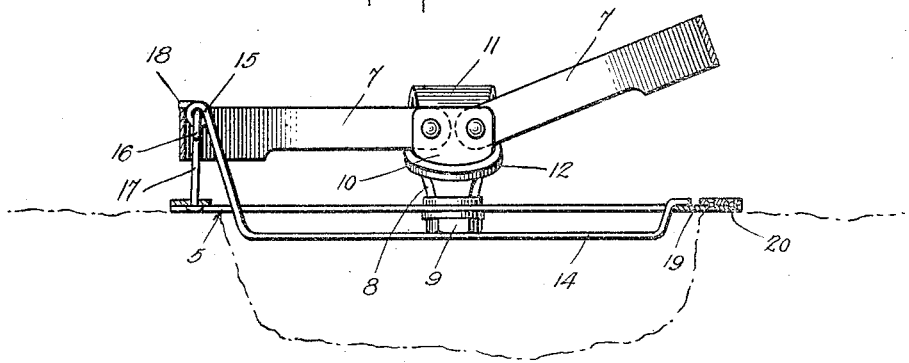
WITNESSES
INVENTOR
HENRY DURRIN Patented Feb. 17, 1925.

1,527,034

UNITED STATES PATENT OFFICE.

HENRY DURRIN, OF LAKE GEORGE, NEW YORK, ASSIGNOR OF ONE-HALF TO FRED H. MURRAY AND ONE-HALF TO DAVID C. WEST, BOTH OF LAKE GEORGE, NEW YORK.

TRAP.

Application filed March 22, 1924. Serial No. 701,190.

*To all whom it may concern:*

Be it known that I, HENRY DURRIN, a citizen of the United States, residing at Lake George, in the county of Warren, State of New York, have invented certain new and useful Improvements in Traps, of which the following is a specification.

This invention relates to traps, and more particularly to traps in which spring means is employed to urge the jaws of the trap to their closed positions.

Briefly stated, an important object of this invention is to provide a spring trap in which the bait is carried substantially below the plane of the jaws so that when the jaws are sprung they will strike the animal on the neck or very close thereto and instantly kill the same.

A further object of the invention is to provide a trap wherein a square base or frame is provided and which extends beyond the jaws when open so as to maintain the jaws free from engagement with the branches of small bush or the like.

A further object is to provide a trap wherein simple and reliable means is provided to anchor the trap to a tree or root.

A further object is to provide a trap which is of highly simplified construction, durable in use and cheap to manufacture.

Other objects and advantages will be apparent during the course of the following description.

In the accompanying drawing forming a part of this application, and in which like numerals are employed to designate like parts throughout the same, Figure 1 is a perspective of the trap set, and Figure 2 is a vertical transverse sectional view taken on the line 2—2 of Figure 1.

In the drawing, wherein for the purpose of illustration is shown a preferred embodiment of the invention, the numeral 5 indicates a frame or base, one side of which is provided with an upstanding ear 6 to which the forward ends of the jaws 7 are pivoted.

In carrying out the invention an attaching stem or bolt 8 is secured to the frame by means of a fastening nut 9 and as illustrated in Figure 1, the upper portion of the stem is provided with a pair of spaced ears 10 to which the rear portions of the jaws 7 are pivotally connected. It will be seen that a stout leaf spring 11 is provided at its ends with loops 12 which receive the stem 8 and the upper loop 12 is large enough to freely receive the jaws 7 when the jaws are released. Therefore, immediately upon the release of the jaws 7 the spring 11 will swing the jaws to closed position into engagement with the head of the animal.

The jaws 7 may be held in open position by means of a trigger 14 formed from a single length of wire and having one end portion formed with an attaching loop 15 connected to the eye 16 on the upper portion of a standard 17 carried by one side of the frame. The wire forming the trigger 14 is extended beyond the loop 15 to define a short finger 18 which engages the upper edge of the adjacent jaw and thereby holds the spring in the position illustrated in Figure 1.

Figure 1 illustrates that the other terminal portion of the trigger 14 rests upon a small lug 19 secured by suitable fastening devices 20 to one side of the frame.

Particular attention is directed to the fact that the bait-supporting trigger 14 is offset and has its major portion disposed substantially below the plane of the frame 5 and substantially below the jaws 7. For this reason the animal must insert its head a substantial distance into the trap and when the trap is sprung the jaws will engage the animal's neck for instantly killing the animal. A further advantage residing in offsetting the major portion of the trigger is the fact that the bait carried by the trigger cannot be easily pulled off the trigger. Any effort to slide the bait longitudinally of the trigger will certainly result in the springing of the trap. More particularly, the bends at the end portions of the trigger prevent the free removal of the bait from the trigger.

The improved trap may be anchored to a tree 22, a root or other stationary member, by means of a chain 23. One end of the chain 23 is attached to the spring 11 by an attaching link 24. To secure the chain about the tree 22 it is merely necessary to pass a bolt 25 through two of the links in the chain and apply a nut 26 to the bolt. By reason of this arrangement it is possible to quickly and securely attach the chain to a tree of almost any diameter. The same attaching method may be employed in connecting the trap to a root, or the like.

With reference to the foregoing description taken in connection with the accompanying drawing it will be seen that a trap constructed in accordance with this invention is positive in its action and will prevent the escape of a trapped animal. Also no unnecessary pain is suffered by the trapped animal because of the quick action of the jaws and the fact that the jaws engage the animal's neck or engage the head very close to the neck. Also the frame supports the jaws in a position to freely operate under the influence of the spring. Particularly if the trap is used on snow-covered ground, the jaws cannot freeze to the snow or ice.

It is to be understood that the form of the invention herewith shown and described is to be taken as a preferred example and that such minor changes in arrangement and construction of parts may be made as will remain within the spirit of the invention and the scope of what is claimed.

Having thus described the invention, what I claim is:—

1. A trap comprising a base, jaws pivoted thereto, a trigger formed from a single length of wire extended across the base and having one end pivoted thereto and its other end loosely supported by the base, one end of said trigger being provided with a short finger to engage one of the jaws.

2. A trap comprising a base, jaws pivoted thereto, a trigger formed from a single length of wire extended across the base and pivoted thereto, one end of said trigger being provided with a short finger to engage one of the jaws, the intermediate portion of the trigger being normally disposed substantially below the plane of the base.

3. A trap comprising a frame, jaws pivoted thereto, a trigger formed from a length of wire having one end portion formed with a loop and a retaining finger, a standard carried by the frame and having pivotal connection with said loop, the major portion of said trigger being disposed below the plane of the frame, and means carried by said frame to support the trigger in an operative position.

4. A trap comprising a frame, jaws pivoted thereto, a trigger formed from a length of wire having one end portion formed with a loop and a retaining finger, a standard carried by the frame and having pivotal connection with said loop, the major portion of said trigger being disposed below the plane of the frame, means carried by said frame to support the trigger in an operative position, and a spring urging the jaws to closed position.

5. A trap comprising a frame, jaws pivoted thereto, a trigger formed from a length of wire having one end portion formed with a loop and a retaining finger, a standard carried by the frame and having pivotal connection with said loop, the major portion of said trigger being disposed below the plane of the frame, means carried by said frame to support the trigger in an operative position, a spring urging the jaws to closed position, the intermediate portion of the trigger being adapted to support bait and the trigger on opposite sides of the bait being formed with bends limiting the movement of the bait on the trigger.

6. A trap comprising a frame, jaws pivoted to the frame, a bait-carrying trigger pivoted to the frame and having a finger adapted to engage one of said jaws, the intermediate portion of said trigger being adapted to support a quantity of bait, and the trigger at opposite sides of the bait being provided with means to limit the endwise movement of the bait and to dispose the bait and the major portion of the trigger substantially below the plane of the frame, and a spring to urge the jaws to closed position.

HENRY DURRIN.